United States Patent [19]

Lehman et al.

[11] 3,877,022

[45] Apr. 8, 1975

[54] ENHANCING RESOLUTION IN ANALOG-TO-DIGITAL CONVERSION BY ADDING STATISTICALLY CONTROLLED NOISE TO THE ANALOG INPUT SIGNAL

[75] Inventors: Joseph L. Lehman, Sarasota, Fla.; Frank Lynch, Hatboro, Pa.

[73] Assignee: Weston Instruments, Inc., Newark, N.J.

[22] Filed: May 14, 1973

[21] Appl. No.: 360,071

[52] U.S. Cl.. 340/347 AD; 178/DIG. 3; 179/15 BP; 235/150.1; 328/151

[51] Int. Cl. .......... H03k 13/00

[58] Field of Search .......... 340/347 AD, 146.3 AG; 328/151; 235/150.1, 150.1 SO; 179/15 BP, 15 AZ, 15 BC; 178/DIG. 3

[56] References Cited

UNITED STATES PATENTS

| | | | |
|---|---|---|---|
| 3,469,515 | 9/1969 | Hillman | 235/150.1 PS |
| 3,526,842 | 9/1970 | Andrew | 328/151 |
| 3,665,326 | 5/1972 | Sullivan | 328/151 |
| 3,697,957 | 10/1972 | Barron | 235/150.1 SO |
| 3,723,879 | 3/1973 | Kaul et al. | 178/DIG. 3 |
| 3,737,584 | 6/1973 | Kaneko et al. | 179/15 BP |

OTHER PUBLICATIONS

Schuchman, Leonard, Dither Signals and Their Effect on Quantization Noise, IEEE Trans. on Communication Technology, Dec. 1964, p. 162.

"Dithering Increases Dynamic Range and Improves Linearity,"Federal Scientific Corporation, Aug. 24, 1973; pg. 1–8.

Max, Joel (Lincoln Lab.-MIT) "Quantizing for Minimum Distortion," IRE Transactions on Information Theory, March 1960, pp. 7–12.

Algazi, Vidal R. (Research Lab of Electronics–MIT): "Useful Approximations to Optimum Quantization,-"IEEE Transactions on Communication Technology, June 1966, pp. 297–301.

*Primary Examiner*—Eugene G. Botz
*Assistant Examiner*—Errol A. Krass
*Attorney, Agent, or Firm*—William R. Sherman; Ivan S. Kavrukov

[57] ABSTRACT

The resolution of analog-to-digital conversion is enhanced by combining the analog input signal, prior to sampling, with a statistically controlled noise signal. The noise signal has a defined probability density function, and its power density spectrum is outside the spectra of the analog input signal and the sampling signal so that none of the noise energy is in the frequency interval of the data of interest following sampling.

21 Claims, 8 Drawing Figures

ENHANCING RESOLUTION IN ANALOG-TO-DIGITAL CONVERSION BY ADDING STATISTICALLY CONTROLLED NOISE TO THE ANALOG INPUT SIGNAL

BACKGROUND AND SUMMARY OF THE INVENTION

The invention is in the field of analog-to-digital conversion and relates specifically to improving and enhancing the resolution of analog-to-digital conversion.

Increasing the resolution of analog-to-digital conversion generally involves increasing the complexity and expense of the conversion devices. Because it is often desirable to provide high resolution, the need exists for methods and means to enhance resolution without unduly complicating the devices used in conversion, and the subject invention is directed to a solution of this problem.

The subject invention is a novel approach and involves adding statistically controlled noise to the analog signal prior to its conversion to a sequence of digitized samples. The basic principle is to combine the analog input signal with a noise signal that effectively increases the number of quantization steps in the conversion but which is orthogonal to the analog input signal so that its effect can be later separated from the true analog input signal.

One situation where this principle is particularly useful is when the analog input signal has a specific power spectrum of interest, the sampling rate of the converter can be defined or is known, and post-processing of the digitized samples is possible. In a situation of this type the noise signal that is combined with the analog input signal prior to conversion is chosen to have a power spectrum which is outside the power spectrum of the analog input signal and of the sampling signal used in conversion, and the noise signal has a defined amplitude probability density in that selected power spectrum.

A noise signal having the essential desirable characteristics may be generated simply and inexpensively in accordance with the invention, and may be combined with the analog input signal prior to conversion to effectively increase the number of the otherwise available quantization steps of the converter. The invention is described in detail as used for converting into a binary coded number system, but it is equally applicable to other number systems.

DETAILED DESCRIPTION

Figure 1:
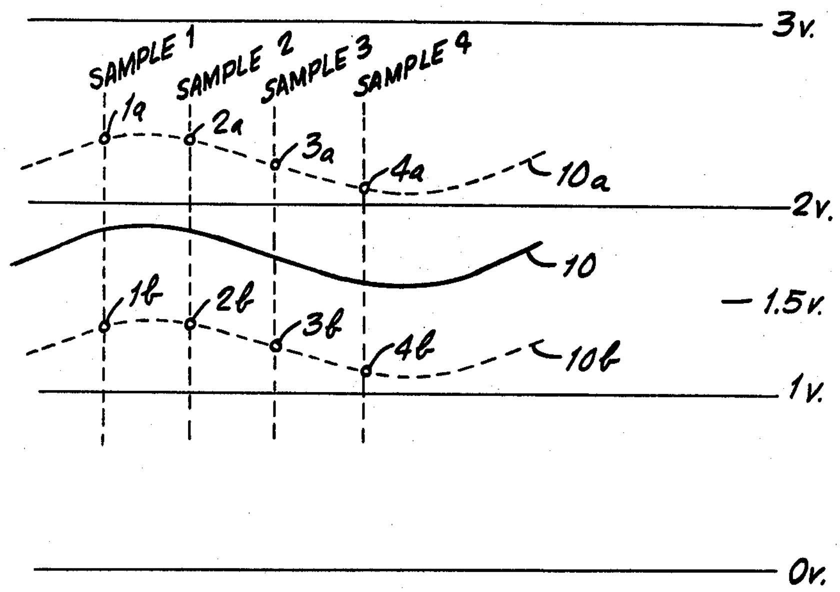
FIGS. 1 and 2 are illustrations of the wave form and the power spectra of an analog input signal, a noise signal combined with it and a sampling signal.
Figure 2:
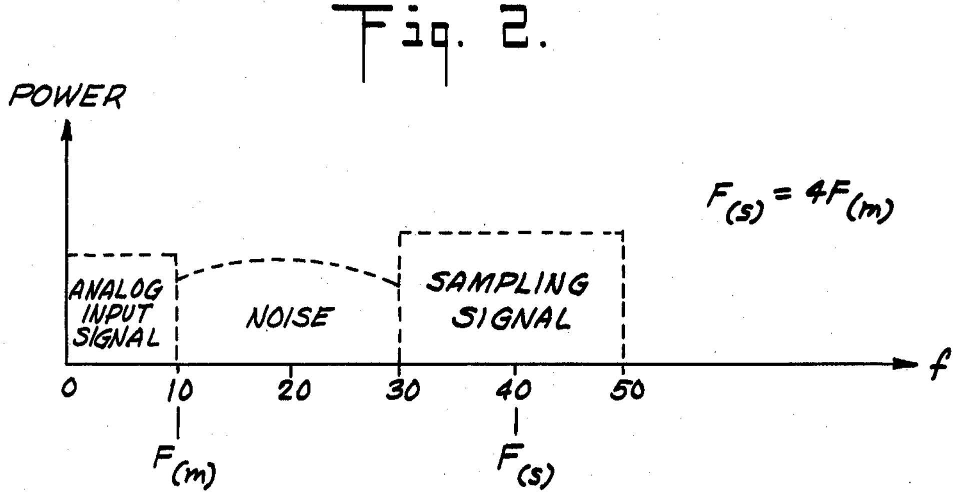

Referring to FIGS. 1 and 2, a time-varying analog input signal 10 is to be converted into digitized samples by a suitable analog-to-digital (AD) converter which has fixed quantization steps, such as the 1 volt steps shown in FIG. 1. The shown portion of the signal 10 varies in amplitude with time, but remains within the single quantization step between 1 volt and 2 volts. If the AD converter is such that analog input signals between 0.5 and 1.5 volts are converted to a 1 volt digital value, analog input signals between 1.5 and 2.5 volts are converted to 2 volt digital signals, etc., the signal 10 shown in FIG. 1 would be converted to a 2 volt digital value although it is in fact less than that. Each of the four samples marked on FIG. 1 would thus yield a 2 volt digital value.

If, however, a noise envelope is added to the signal 10 such that the signal 10 becomes the band defined between the envelope borders 10*a* and 10*b*, and if the noise envelope is random such that the value of the sample 1 can be anywhere between the points 1*a* and 1*b*, the value of sample 2 can be anywhere between the points 2*a* and 2*b*, etc., then it is statistically likely that some of the samples would yield a 2 volt digital value and some would yield a 1 volt digital value. It is also statistically likely that if the samples are redundant, an averaging of a group of redundant samples would give a value that is closer to the true value of the analog signal 10 than the 2 volt value that would result from the simple quantization steps shown in FIG. 1.

One of the requirements of the noise signal utilized in the invention is that its amplitude probability density should define the noise envelope illustrated as the band between the curves 10*a* and 10*b*. The noise signal should ideally have an amplitude probability density function which is zero except over the interval between one-half of a quantization step below the analog input signal and one-half of a quantization step above the analog input signal. Over the interval where it is not zero, the amplitude probability density function of the noise signal should have a specified constant value.

Another requirement is that the noise signal should ideally have a power density spectrum which is zero in the frequency band of the analog input signal following sampling. In the example of FIG. 2, where the maximum frequency of an arbitrarily chosen analog input signal is F(*m*) and the frequency of the sampling signal is F(*s*), the power density spectrum of the noise signal should be in the indicated area.

In the case of an analog-to-digital conversion where an input analog signal E whose full scale value is E(max) is converted to a binary coded signal which is N bits long, the maximum frequency of interest in the analog input signal is F(*m*), and the sampling rate F(*s*) is 4 times the frequency F(*m*), the ideal requirements discussed above can be stated as follows: the noise signal should ideally have an amplitude probability density function which is zero except over the interval from $[E(max)][-2^{-(N+1)}]$ to $[E(max)][2^{-(N+1)}]$; in the non-zero interval, the amplitude probability density function of the noise signal should ideally have a constant value $[(2^N)/E(max)]$. The noise signal should ideally have a power density spectrum which is zero over the frequency intervals [KF(s)–F(m)] to [KF(s) + F(m)] for K = 0,1,2 . . . ., so that none of the noise signal energy would be in the frequency interval of the data of interest following sampling.

In view of the requirements on the noise signal discussed above, it can be appreciated that an analog input signal having a bandwidth F(*m*) can be completely defined by a set of [2F(*m*)*t*] independent samples over the interval of time *t*. If the input analog signal is sampled at a rate KF(*m*), where K is greater than 2, and is subsequently quantized, the redundant information can be used to increase the effective number of quantization steps. Each sequence of [K/2] samples can be averaged following quantization resulting in [2F(*m*)*t*] averaged samples over the time interval *t*. Thus, the input analog signal remains completely defined by the fewer averaged samples. The value of the averaged sample can assume [K/2] times as many discrete steps as the original quantizations. This results from the solution of $$\left[(2/K)\sum_{i=1}^{K/2} S(i)\right]$$

where S(*i*) is the *i*-th sample. If a noise signal of the type discussed above is added to the analog input signal prior to quantizing, the average of the [K/2] sequence of samples approaches the value of the analog input signal regardless of the quantization levels of the analog-to-digital converter as K approaches infinity.

A simple network which embodies the principles of the invention discussed above is shown in FIGS. 3 and 4 and is explained here in conjunction with the illustrations of FIGS. 5 through 8.

Figure 3:
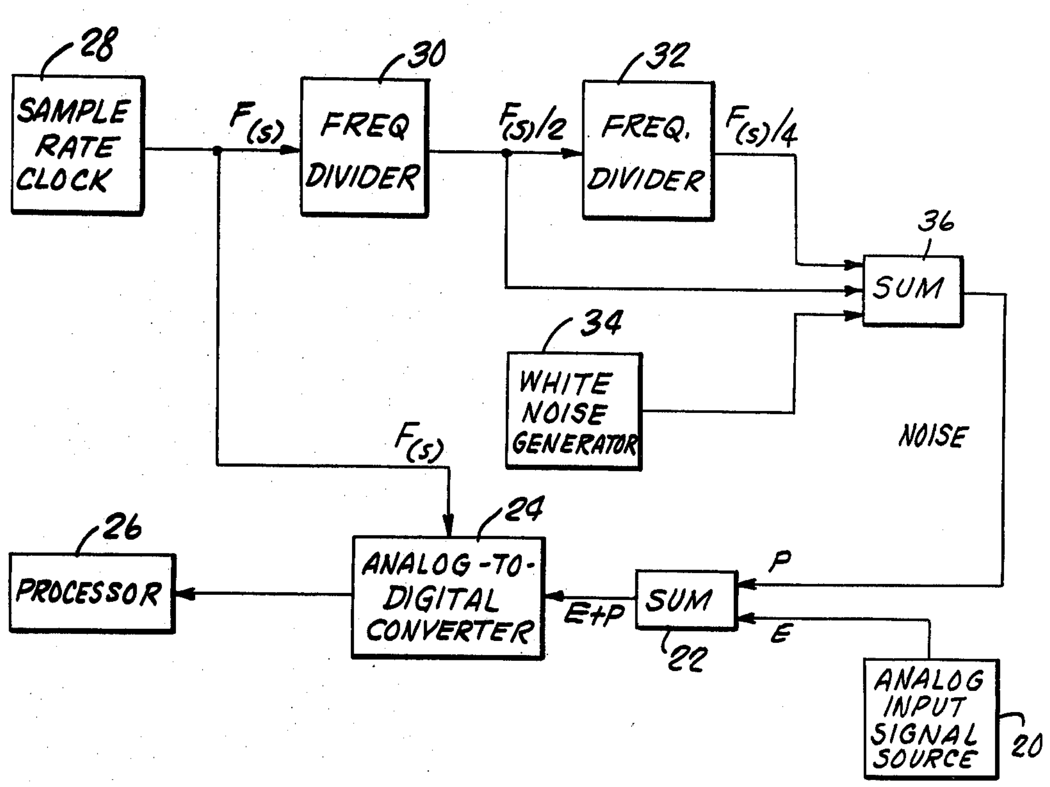
FIG. 3 is a block diagram of a network embodying the invention.

In FIG. 3 an analog input signal E is derived from a source 20 which may, for example, be a suitable transducer such as a photocell. The analog input signal E from the source 20 is combined in a sum network 22 with a noise signal P which approximates the ideal requirements discussed above. The output of the sum network 22 is the combination of the analog input signal E and of the noise signal P, and this combined signal is applied to an analog-to-digital converter 24. The analog-to-digital converter 24 may be any suitable converter, such as a conventional single slope analog-to-digital converter. It samples the combined signal E+P from the sum network 22 at a rate F(*s*) to provide a sequence of digitized samples to a processor 26.

The sampling frequency F(*s*) is provided from a sample rate clock 28 which may be any suitable oscillator, such as a crystal controlled oscillator. The output of the sample rate clock 28, which may be available as an adjunct of the analog-to-digital converter 24, is also used in forming the required noise signal P. Specifically, the output of the sample rate clock is frequency divided by 2 in a divider 30 to obtain a square wave at frequency F(*s*)/2, and the output of the divider 30 is further frequency divided by 2 in a divider 32 to obtain another square wave at frequency F(*s*)/4. The outputs of the frequency dividers 30 and 32, and the output of a white noise generator 34 are added together in a sum network 36 to form the required noise signal P which is applied to the sum network 22. The frequency dividers 30 and 32 may be any conventional dividers, such as flip-flops, and the white noise generator 34 may be any suitable source, such as a Zener diode. The summing networks 36 and 22 may, for example, be operational amplifiers.

Figure 4:
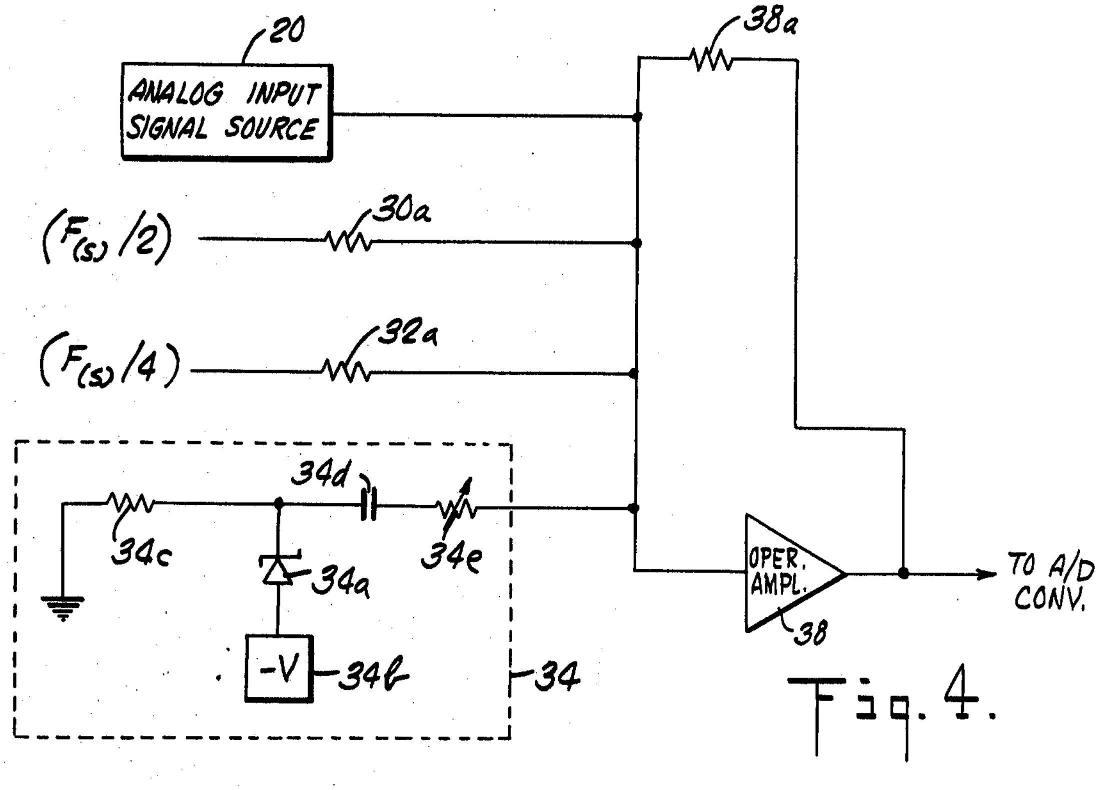
FIG. 4 is a partly circuit and partly block diagram of a portion of the network of FIG. 3.

One example of an embodiment of certain elements shown in FIG. 3 is illustrated in FIG. 4 where the analog input signal source 20 is the same as that in FIG. 3. A conventional operational amplifier 38 performs the functions of the summing networks 22 and 36 of FIG. 3. The function of the white noise generator 34 is performed by a Zener diode **34*a* having one side connected to a negative voltage source 34*b* providing, for example, −15 volts, and having its other side connected to ground through a suitable resistor 34*c*. The Zener diode 34*a* is connected as one input to the operational amplifier 38 through a large capacitor 34*d*. The other inputs of the operational amplifier 38 are from the frequency dividers 30 and 32, whose outputs are amplitude adjusted by resistors 30*a* and 32*a* respectively, and the analog input signal from the source 20. A suitable gain resistor 38*a* is used, and a variable resistor 34*e* may be used to select a suitable amplitude level of the white noise signal from the Zener diode 34*a*. The output of the operational amplifier 38 is the signal labelled E + P which is applied to the analog-to-digital converter 24 of FIG. 3.**

Figure 5:
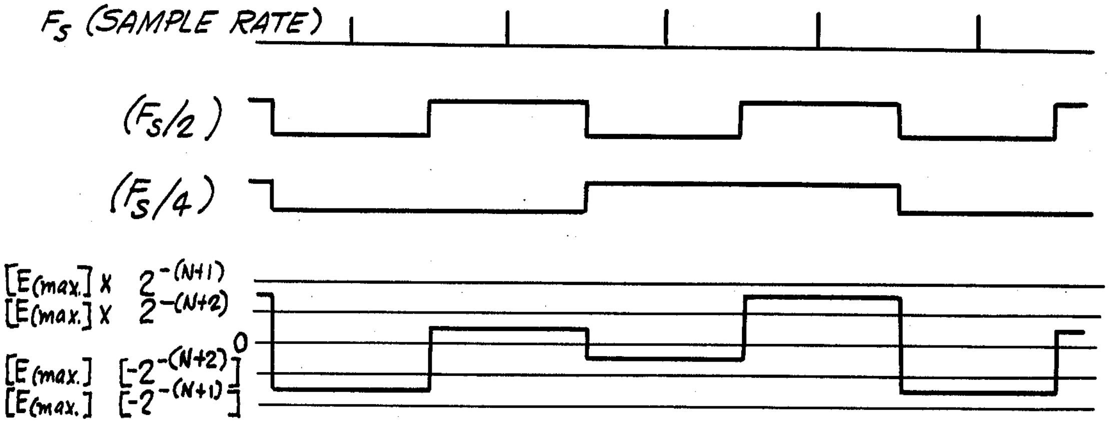
FIG. 5 shows the wave forms of signals utilized in the networks of FIGS. 3 and 4.

Referring to FIGS. 5 through 8, the output of the sample rate clock 28 of FIG. 3 is the top curve in FIG. 5, the output of the frequency divider 30 is the second curve from the top in FIG. 5, and the output of the frequency divider 32 is the third curve from the top in FIG. 5. When the outputs of the frequency dividers 30 and 32 are combined with each other in the summing network 36, and the amplitude of the output from the frequency divider 30 is twice the amplitude of the output from the frequency divider 32, the result is the composite curve shown at the bottom of FIG. 5. The relative amplitude levels of the outputs from the dividers 30 and 32 may be selected by suitably selecting the values of the resistors 30a and **32*a* shown in FIG. 4.**

The amplitude levels of the outputs of the frequency dividers 30 and 32 are selected by the values of the resistors 30a and 32a such that the steps of the composite curves shown at the bottom of FIG. 5 are as indicated in the figure. The amplitude probability density of the composite signal shown as the bottom curve in FIG. 5 forms the four equal area impulse functions illustrated in FIG. 6.

Figure 8:
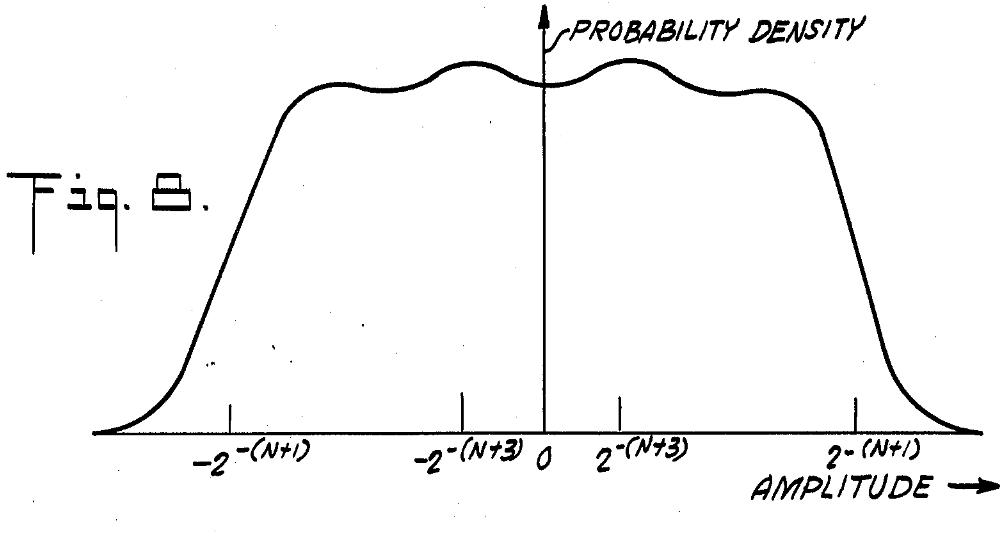
FIG. 8 shows the amplitude probability density of a combined noise signal used in the networks of FIGS. 3 and 4.

In order to approximate the required noise signal, the composite curve at the bottom of FIG. 5 is smoothed by the white noise from the noise generator 34, with the result that the amplitude probability density of the noise signal becomes as illustrated in FIG. 8. The RMS amplitude of the noise from the generator 34 may be adjusted by the variable resistor 34e such that it is, for example, $0.9 \times E(max) \times 2^{-(N+3)}$.

Figures 6, 7:
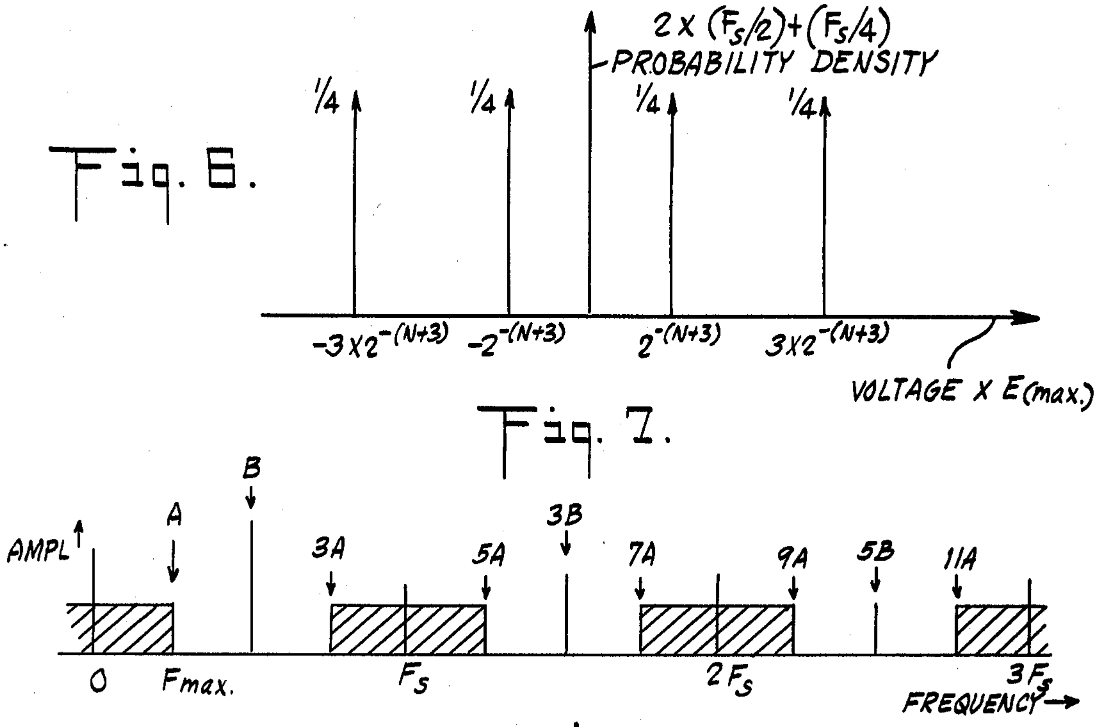
FIG. 6 shows the probability density of signals shown in FIG. 5.
FIG. 7 shows the frequency band occupancy of signals used in the networks of FIGS. 3 and 4.

The noise P which is obtained from the networks shown in FIGS. 3 and 4 approximates the ideal requirements discussed above. Referring to FIG. 7, the spectral energy of the periodic portion of the noise signal is at the lines labelled A and B and odd multiples thereof, and it is seen that this energy should tend not to produce frequency components within the data frequency bands defined by the shaded areas in FIG. 7.

While the above embodiment of the invention was described in terms of a binary coded output from the analog-to-digital converter 24, the principles of the invention are equally applicable to other number systems. Using X to designate the base of an arbitrary number system and N to designate the number of digits of the digitized samples in that number system, the ideal requirements discussed above translate to the requirements that (1) the noise signal should ideally have an amplitude probability density function which is 0 except over the interval from $[-X^{-N}/2][E(\max)]$ to $[+X^{-N}/2][E(\max)]$; and over the nonzero interval the amplitude probability density function should have a constant value $[X^{N}/E(\max)]$. The square waves from the frequency dividers 30 and 32 should be summed such that the resulting amplitude takes on discrete values at $[\pm X^{-N}/2^3][E(\max)]$ and at $[\pm 3X^{-N}/2^3][E(\max)]$; and the white noise from the generator 34 should have an RMS amplitude of approximately $[(0.9)(X^{-N})/2^3][E(\max)]$.

The output of the analog-to-digital converter 24 of FIG. 3 is a sequence of digitized samples each N bits long. This sequence of digitized samples is applied to a processor 26 which may be any suitable processer that takes into account the redundancy of the digitized samples from the converter 24 and removes the effect of at least some of the noise added to the analog input signal prior to digital conversion. For example, the processer 26 may be the relevant portion of a spectrum analyzer that is concerned only with a frequency band which is equal to or less than the maximum frequency $F(m)$ of the analog input signal. This may be a part of a spectrum analyzer of the type disclosed in the copending patent application of the same inventors which is entitled "Fully Digital Spectrum Analyzer Using Time Compression and Discrete Fourier Transform Techniques" and was filed on the same date as the subject application under Ser. No. 360,098.

What is claimed is:

1. A method of converting a time varying analog input signal to a sequence of digitized samples, comprising the steps of:

generating a noise signal which is substantially independent of the analog input signal and has a selected amplitude probability and a selected power spectrum;

combining the noise signal with the analog signal; and sampling the resulting combined signal at a rate $F(s)$ which is greater than twice the maximum frequency $F(m)$ of interest in the analog input signal and generating a sequence of digitized samples of the combined signal at said sampling rate, said sequence digitized samples comprising a separable component reflecting the noise portion of the combined signal, wherein said power spectrum of the noise signal is substantially outside the power spectrum of the analog input signal or of digitized samples of the analog input signal.

2. A method as in claim 1 wherein the step of generating a noise signal includes selecting an amplitude probability density function of the noise signal which is substantially zero except substantially over the interval from $-2^{-(N+1)}$ to $+2^{-(N+1)}$ times the full scale amplitude of the analog input signal, where the digitized samples are in binary code and N is the number of bits of each digitized sample.

3. A method as in claim 2 wherein the step of generating a noise signal includes selecting an amplitude probability density function of the noise signal over the nonzero interval which is approximately $2^N$ divided by the amplitude of the full scale analog input signal.

4. A method as in claim 3 where the step of generating a noise signal includes selecting a power density spectrum of the noise signal which is substantially zero over substantially the frequency intervals $KF(s)-F(m)$ to $KF(s)+F(m)$ for $K = 0,1,2 \ldots$.

5. A method as in claim 4 wherein the sampling step includes sampling at a rate which is at least four times the maximum frequency of interest in the analog input signal.

6. An apparatus for converting a time varying analog input signal to a sequence of digitized samples, comprising:

means for generating a noise signal which is substantially independent of the analog input signal and has a selected amplitude probability and a selected power spectrum;

means for combining the noise signal with the analog input signal to provide a combined signal; and means for sampling the combined signal at a rate greater than twice the maximum frequency of interest in the analog input signal and for generating a sequence of digitized samples of the combined signals at said sampling rate, said sequence of digitized samples comprising a separable component reflecting the noise portion of the combined signal, wherein the analog input has a defined power spectrum of interest and the power spectrum of the noise signal is substantially outside said defined power spectrum of the analog input signal.

7. An apparatus as in claim 6 wherein the means for generating digitized samples includes means defining a plurality of quantization steps and wherein the amplitude probability of the noise signal is within an envelope surrounding the analog input signal and having an amplitude dimension which is approximately one quantization step peak-to-peak.

8. An apparatus as in claim 6 wherein the sampling rate is at least four times the maximum frequency of interest of the analog input signal.

9. An apparatus as in claim 6 wherein the generating means comprise means for generating a digital noise signal having a repeating plurality of amplitude levels, means for generating a white noise smoothing signal whose average amplitude is substantially less than the digital noise signal, and means for combining the two last recited signals to form said noise signal.

10. An apparatus as in claim 9 wherein the means for generating the digital noise signal comprise means for generating a clock signal at the sampling rate, means for generating time subdivided clocks at half and one-quarter the rate of said clock signals, and means for combinding said time subdivided clocks to form said digital noise signal, wherein the digital noise signal has a repeating sequence of four different amplitude levels.

11. A method of converting an analog signal having a defined frequency range of interest into a digital signal, comprising the steps of:

defining a succession of quantum levels each corresponding to a different amplitude;

generating a noise signal having a selected power spectrum which is substantially outside the power spectrum of interest in the analog signal and having an amplitude probability distribution that is substantially uniform within an amplitude band whose width is related in a selected manner to the amplitude difference between adjacent quantum levels;

combining the analog signal and the noise signal to provide a combined signal;

sampling the combined signal at a rate higher than twice the maximum frequency of the analog signal frequency range to provide a succession of samples, finding a quantum level corresponding to the amplitude level of the combined signal at the time of each sample, and providing indications of the found quantum levels; and averaging the provided indications over selected averaging intervals, and providing on the basis of the averaging a digital signal representing the amplitude level of the analog signal at each averaging interval.

12. A method as in claim 11 wherein the sampling rate is at a defined frequency, and wherein the noise signal has a power spectrum which is substantially outside the power spectrum of the sampling rate frequency.

13. A method as in claim 12 wherein the quantum levels are uniformly distributed, and wherein the width of the noise signal amplitude band is approximately equal to the difference in amplitude between two adjacent quantum levels.

14. An analog-to-digital conversion system including an analog-to-digital converter having an input terminal for receiving an input signal, means for sampling the signal at the input terminal at a defined sampling frequency, means for converting each sample to a digital signal representing a corresponding one of a succession of quantum levels, and an output terminal providing said digital signal, wherein the improvement comprises:

means for providing an unknown analog signal having a defined frequency range of interest;

means for generating a noise signal having a selected power spectrum which is substantially outside the power spectrum of the frequency of interest in the analog signal and having an amplitude probability distribution that is substantially uniform within an amplitude band whose width is related in a selected manner to the amplitude difference between adjacent quantum levels of the analog-to-digital converter;

means for combining the analog signal and the noise signal to provide a combined signal;

means for applying the combined signal to the input terminal of the analog-to-digital converter to be sampled thereby and converted to said digital signal; and averaging means connected to the output terminal of the analog-to-digital converter for receiving said digital signal, for averaging it over selected averaging intervals, and for providing output signals representing the amplitude level of the unknown analog signal at each averaging interval.

15. A system as in claim 14 wherein the noise signal is a digital signal having a repeating sequence of at least four different amplitude levels and combined with a low-level white noise signal for smoothing.

16. A method of converting an analog signal into a digital signal, comprising the steps of:

generating a noise signal having a selected power spectrum outside the power spectrum of interest in the analog signal and having a selected amplitude probability distribution;

combining the analog signal and the noise signal to provide a combined signal;

sampling the combined signal to provide a succession of samples;

converting each sample to a quantum value signal; and averaging the provided quantum value signals over selected averaging intervals and providing on the basis of the averaging a digital signal representing the amplitude level of the analog signal at each averaging interval.

17. A method as in claim 16 wherein the sampling is carried out at a defined sampling frequency and wherein the power spectrum of the noise signal is substantially outside the power spectrum of the sampling signal frequency.

18. A method as in claim 17 wherein the amplitude probability distribution is a function of the difference in amplitude between adjacent quantum value signals.

19. A method as in claim 18 wherein the analog signal has a defined full scale value and wherein the amplitude probability distribution of the noise signal is a function of the full scale value of the analog signal.

20. A method as in claim 16 wherein the analog signal has a defined full scale value and wherein the amplitude probability distribution of the noise signal is substantially uniform within a band whose width is a function of the full scale value of the analog signal and of the quantum value signals to which each sample is converted, and the amplitude probability of the noise signal is substantially zero outside said band.

21. A method as in claim 16 wherein the noise signal is in the form of a digital signal having a repeating sequence of at least four different amplitude levels and combined with a low level white noise signal for smoothing.

* * * * *